(12) United States Patent
Mildenberger

(10) Patent No.: US 11,438,681 B2
(45) Date of Patent: Sep. 6, 2022

(54) METHOD FOR PRODUCING A PLASTIC-COATED LOUDSPEAKER HOUSING AND PLASTIC-COATED LOUDSPEAKER HOUSING

(71) Applicant: d&b audiotechnik GmbH & Co. KG, Backnang (DE)

(72) Inventor: Albrecht Mildenberger, Aspach-Allmersbach (DE)

(73) Assignee: d&b audiotechnik GmbH & Co. KG, Backnang (DE)

( * ) Notice: Subject to any disclaimer, the term of this patent is extended or adjusted under 35 U.S.C. 154(b) by 400 days.

(21) Appl. No.: 16/716,940

(22) Filed: Dec. 17, 2019

(65) Prior Publication Data

US 2020/0204891 A1 Jun. 25, 2020

(30) Foreign Application Priority Data

Dec. 19, 2018 (DE) .................. 10 2018 132 886.9

(51) Int. Cl.
*H04R 1/02* (2006.01)
*B29C 45/14* (2006.01)
*H04R 5/02* (2006.01)
*B29L 31/34* (2006.01)

(52) U.S. Cl.
CPC ....... *H04R 1/026* (2013.01); *B29C 45/14778* (2013.01); *H04R 5/02* (2013.01); *B29L 2031/3418* (2013.01)

(58) Field of Classification Search
CPC .... H04R 1/026; H04R 5/02; B29C 45/14778; B29L 2031/3418
See application file for complete search history.

(56) References Cited

U.S. PATENT DOCUMENTS

| 4,509,615 | A | * | 4/1985 | Hruby | .................... | H04R 1/288 |
| | | | | | | 181/146 |
| 4,964,482 | A | * | 10/1990 | Meyer | ..................... | H04R 1/02 |
| | | | | | | 181/146 |
| 2006/0237259 | A1 | * | 10/2006 | Lowe | ....................... | B41J 29/10 |
| | | | | | | 181/201 |

FOREIGN PATENT DOCUMENTS

| DE | 3429353 A1 | 3/1986 | |
| DE | 4322753 A1 | 1/1995 | |
| DE | 10022360 A1 | 11/2001 | |
| EP | 1873521 A1 | 1/2008 | |
| EP | 2962830 A1 | 1/2016 | |
| EP | 3345737 A1 | 7/2018 | |
| GB | 2350967 A * | 12/2000 | .......... H04R 1/2888 |
| WO | 8502895 A1 | 7/1985 | |

* cited by examiner

*Primary Examiner* — Andrew L Sniezek
(74) *Attorney, Agent, or Firm* — Cooper Legal Group, LLC

(57) ABSTRACT

A method for producing a plastic-coated loudspeaker housing comprises the putting together of a loudspeaker housing from a plurality of housing wall elements. The put-together loudspeaker housing is placed in a mold. This is followed by a surface coating of the put-together loudspeaker housing by introducing a liquid, curable plastic into the mold.

10 Claims, 5 Drawing Sheets

METHOD FOR PRODUCING A PLASTIC-COATED LOUDSPEAKER HOUSING AND PLASTIC-COATED LOUDSPEAKER HOUSING

RELATED APPLICATIONS

This application claims priority to German Patent Application 10 2018 132 886.9, filed on Dec. 19, 2018, which is incorporated herein by reference.

TECHNICAL FIELD

The invention relates to a method for producing a plastic-coated loudspeaker housing and to a plastic-coated loudspeaker housing.

BACKGROUND

Loudspeaker housings of loudspeaker enclosures are generally assembled from wooden panels. The production sequence is complex. After cutting them to size, the wooden panels are glued and screwed together, in order to achieve the required mechanical stability. The required freedom from rattling and airtightness of the loudspeaker housing is also only ensured by the gluing. Subsequently, the surfaces of the loudspeaker housing must be smoothed, leveled with filler and primed in a number of complex manual operations. After that, the surfaces are ready for painting, the surface painting of the loudspeaker housings also representing a laborious and expensive working step.

SUMMARY

An object on which embodiments disclosed herein are based can be considered that of providing a method for producing a loudspeaker housing that avoids at least some of the stated disadvantages of the previous production procedure. In particular, manual operations are to be made easier or eliminated, without thereby impairing the mechanical, acoustic and/or visual properties of the loudspeaker housing. Furthermore, the embodiments disclosed herein aim to create a loudspeaker housing with the properties of a high-quality product and exact dimensional stability.

According to one aspect, an embodiment of a method for producing a plastic-coated loudspeaker housing may comprise the putting together of a loudspeaker housing from a plurality of housing wall elements. The put-together loudspeaker housing is placed in a mold. This is followed by a surface coating of the put-together loudspeaker housing by introducing a liquid, curable plastic into the mold.

According to one aspect, a plastic-coated loudspeaker housing includes a loudspeaker housing comprising a plurality of housing wall elements and a layer of plastic which covers the loudspeaker housing on the outside and which coats corner regions of housing wall elements butting against one another.

DESCRIPTION OF THE DRAWINGS

Embodiments and examples of the invention are explained in more detail below with reference to the drawings. In them, the same reference signs designate parts that are identical or similar to one another.

DETAILED DESCRIPTION

Figure 1A:
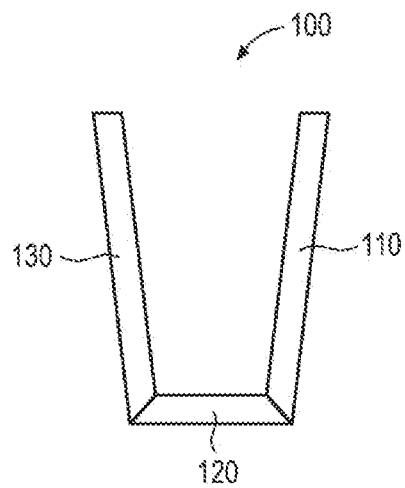
FIGS. 1A-D show successive stages of a method given by way of example for producing a plastic-coated loudspeaker housing.

Generally and in view of all embodiments and examples disclosed herein, a series of characteristics and potential advantages can be achieved by the plastic coating of the put-together loudspeaker housing.

Firstly, no special surface pretreatment of the housing wall elements is needed before the plastic coating. In other words, the steps of smoothing and/or leveling with filler and/or priming the surface of the housing can be eliminated, or at least significantly reduced.

All surface defects or even holes there may be in the housing wall elements are completely covered over by the plastic coating. Deviations from the nominal thickness of the housing wall elements used are also corrected, so that the coated housing always has exact dimensions, predetermined by the mold.

The plastic coating may be advantageous in particular at butt joints between adjacent housing wall elements. This—unlike painting—allows several properties that are important for a loudspeaker housing (for example mechanical stability, airtightness, freedom from rattling) to be helped or brought about.

The loudspeaker housing is ready for painting after the surface coating. It may also be envisaged that, when a suitable plastic coating is used, painting is eliminated entirely.

According to one exemplary embodiment, the putting together of the loudspeaker housing may represent a simplified assembly of the loudspeaker housing (in comparison with conventional loudspeaker housing construction) in which the properties required for later operation—such as for example robustness and/or airtightness and/or freedom from rattling—are not achieved. That is to say that, the putting together of the loudspeaker housing for placing into the mold may merely constitute a preliminary assembly of the loudspeaker housing that would not be sufficient for conventional loudspeaker housing construction.

According to one exemplary embodiment, when putting together the loudspeaker housing, adhesive connections between housing wall elements may be partly, largely or completely dispensed with. If butt joints are designed such that the plastics compound of the surface coating can penetrate into the interspaces of adjacent housing wall elements, both an airtight termination and a rattle-free and very stable connection between the housing wall elements can be achieved in this way.

According to one exemplary embodiment, when putting together the loudspeaker housing, screw connections between housing wall elements may be partly, largely or completely dispensed with. Instead, it may be envisaged to connect the housing wall elements by connecting techniques that are simpler, quicker and require less working effort (than a screw connection).

For example, it may be envisaged to put housing wall elements together by tacking connections instead of by screw connections, or to replace at least some of the screw connections that are laborious to produce by simple tacking (stapling). The robustness required for transporting the loudspeaker housing and/or for high sound pressures during operation is in this case only provided by the surface coating.

The stability of the connection between housing wall elements can be increased by a fastening cavity which is filled with the plastic during the surface coating being provided in the region of abutment of a corner connection of a first housing wall element and a second housing wall element that have been put together.

An exemplary embodiment of a plastic-coated loudspeaker housing accordingly has a loudspeaker housing comprising a plurality of housing wall elements and also a layer of plastic which covers the loudspeaker housing on the outside and coats the corner regions of housing wall elements butting against one another.

To increase the stability of the loudspeaker housing, it may be envisaged that a fastening cavity which is filled with the plastic of the layer of plastic is provided in the region of abutment of a corner connection of a first housing wall element and a second housing wall element.

For example, the fastening cavity may comprise a first recess in the first housing wall element and a second recess in the second housing wall element. In this case, the first recess and the second recess are in connection with one another and are filled with the plastic. The first recess may be for example a first groove and/or the second recess may be for example a second groove.

The fastening cavity filled with plastic may be in connection with the layer of plastic by way of a gap between the first housing wall element and the second housing wall element. During surface coating, plastic can penetrate into the fastening cavity through the gap and later solidify there and adhesively bond the housing wall elements.

The first housing wall element may have a first groove and a tongue on a first connecting surface, in particular an end face or a first miter face, and the second housing wall element may have a second groove on a second connecting surface, in particular a flat side or a second miter face. In this case, the tongue can enter the second groove and the fastening cavity can be delimited at least by the first groove, the second groove and the tongue. Such a design of the fastening cavity allows a high-strength anchorage between the first and second housing wall elements to be achieved.

FIG. 1A shows in a simplified representation a loudspeaker housing 100 in a sectional representation. Three housing wall elements 110, 120, 130 in the put-together or preassembled state can be seen. The wall elements 110 and 130 may for example form an upper side and an underside of the loudspeaker housing 100, while the wall element 120 in this example may represent the rear side of the loudspeaker housing 100. As can be seen from FIG. 1A, the wall elements 110, 120, 130 may be in connection with one another at corners of the loudspeaker housing 100.

The putting together of the wall elements 110, 120, 130 may take place for example by tack connections. It is also possible that there are adhesive point, part-area or full-area connections between the wall elements 110, 120, 130 and/or that the wall elements 110, 120, 130 are screwed to one another. As explained in still more detail below, it may however be possible to dispense both with adhesive connections and with screw connections entirely or largely (i.e. over more than 50% of the length of the butt joint). In particular, in the put-together state represented in FIG. 1A, the loudspeaker housing 100 may not satisfy the stability criteria and/or quality criteria (for example airtightness, freedom from rattling) required for later use of the loudspeaker enclosure.

The wall elements 110, 120, 130 may consist of wood or be of a wood-based construction. For example, multiplex panels consisting of a number of plies or else lightweight sandwich wooden panels with materials lying in between (for example with a plastic honeycomb core) or panels constructed from composite materials on a wood base may be used. Furthermore, panels consisting of other materials may also be used as wall elements 110, 120, 130, for example plastic panels. The width of the wall elements 110, 120, 130 may for example lie between 10 mm and 20 mm, and in particular be between 12 and 18 mm or 14 and 16 mm.

In the stage of the production sequence that is represented in FIG. 1A, the wall elements 110, 120, 130 may be largely or completely untreated (raw). In particular, it is not required that the outer surfaces of the wall elements 110, 120, 130 have undergone special surface operations, such as for example smoothing, leveling with filler, finishing and the like, as are required for subsequent painting.

Figure 1B:
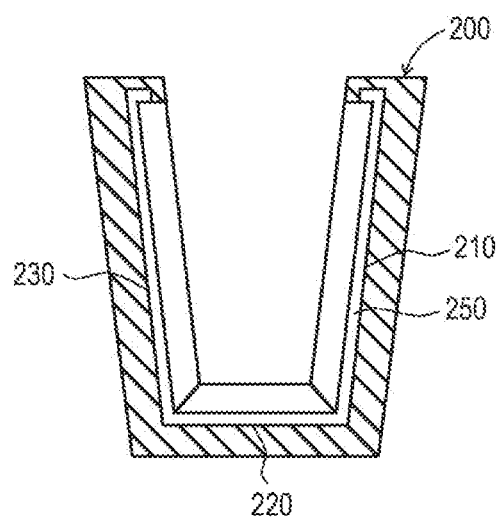

According to FIG. 1B, the preassembled loudspeaker housing 100 is then placed into a mold 200. The mold 200 has a shape corresponding to the outer shape of the loudspeaker housing 100, mold surfaces 210, 220 and 230 that respectively correspond to the surfaces of the housing wall elements 110, 120, 130 being made somewhat larger in size than the loudspeaker housing 100, so that a gap 250 remains between the housing wall elements 110, 120, 130 and the opposing mold surfaces 210, 220 and 230, respectively.

The gap 250 may for example have a gap width of less than, equal to or greater than 2 mm, 1.5 mm, 1 mm or 0.5 mm. Openings in the wall elements 110, 120, 130 may be closed either by the mold 200 (see for example the front-side opening) or by covers previously provided on the loudspeaker housing 100.

Figure 1C:
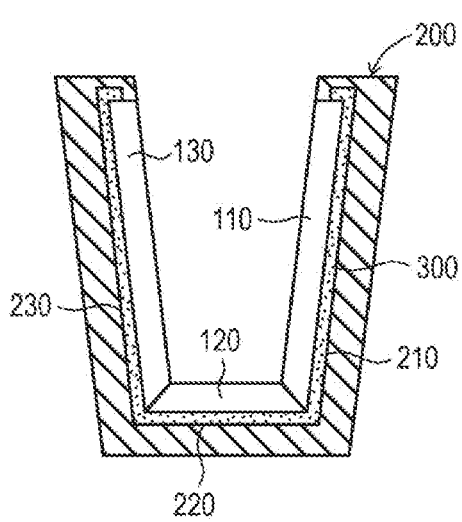

FIG. 1C shows a surface coating of the put-together (preassembled) loudspeaker housing 100 by introducing a liquid, curable plastic 300 into the mold 200. The plastic 300 fills the gap 250 between the housing wall elements 110, 120, 130 and the opposing mold surfaces 210, 220 and 230, respectively. The coating of the put-together loudspeaker housing 100 with the plastic 300 has the effect that surface defects or depressions or holes in the surfaces of the wall elements 110, 120, 130 are covered over. Furthermore, the plastic can penetrate into interspaces of butt joints of the wall elements 110, 120, 130 and adhesively bond them.

Polyurea or polyurethane (PU), with or without additional fillers, may be used for example as plastics. Both paintable plastics and plastics that form visible surfaces without later painting being required may be used.

An RIM (Reaction-Injection-Molding) process may be used for example for the surface coating. In the RIM process, a polymer comprising (at least) two components is mixed directly when it is introduced into the mold 200 ("floating"). The two components react quickly, and so cycle times of just a few minutes are achievable.

By surface coating by means of the RIM process, surfaces that have a pleasing appearance and feel can be produced. Furthermore, the Shore hardness, UV (ultraviolet) resistance, chemical resistance and many other parameters of the coating can be set by a suitable choice of the components. Transparent coatings may be used, in order for example to improve the finish of wood or carbon surfaces, and it is possible to produce RAL-compliant colored surface coatings. Rigid integral foams may be used for the surface coating, whereby the mechanical and/or structural properties of the loudspeaker enclosure can be particularly influenced, but it is also possible to use flexible foams.

The mold 200 may for example be produced from aluminum. Heating elements (not shown), which make it possible to carry out the curing process at elevated temperatures (for example higher than 50° C., in particular up to approximately 75° C.), may be provided in the wall regions of the mold 200.

Figure 1D:
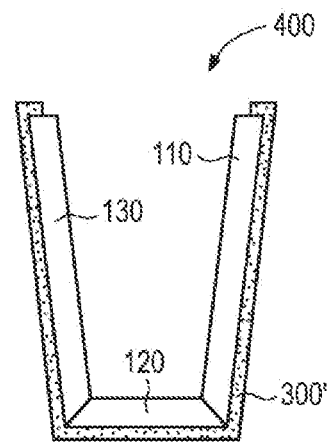

After the surface coating and curing of the plastic 300, the plastic-coated loudspeaker housing 400 is removed from the mold 200, see FIG. 1D. For the demolding of the plastic-coated loudspeaker housing 400 from the mold 200, a release agent may be used, which may either be sprayed into the mold 200 or admixed with the components of the plastic. By admixing the release agent with the components of the plastic, the process can be simplified and release agent saved.

After demolding, the removed plastic-coated loudspeaker housing 400 may be deflashed, if so required.

Subsequently, the surface of the plastic coating 300' that is "contaminated" with release agent may be either ground or activated (in a way not shown) for subsequent processes, for example later painting or applying a texture (for example mottling). The activation may be performed by way of a plasma nozzle system, which is passed over the surface of the plastic coating 300' for example by a robot.

A further possibility for the surface structuring of the plastic-coated loudspeaker housing 400 is to etch the mold 200 before it is used. In this way, a texture of the surface of the plastic coating 300' that is always the same can be achieved.

Figure 2:
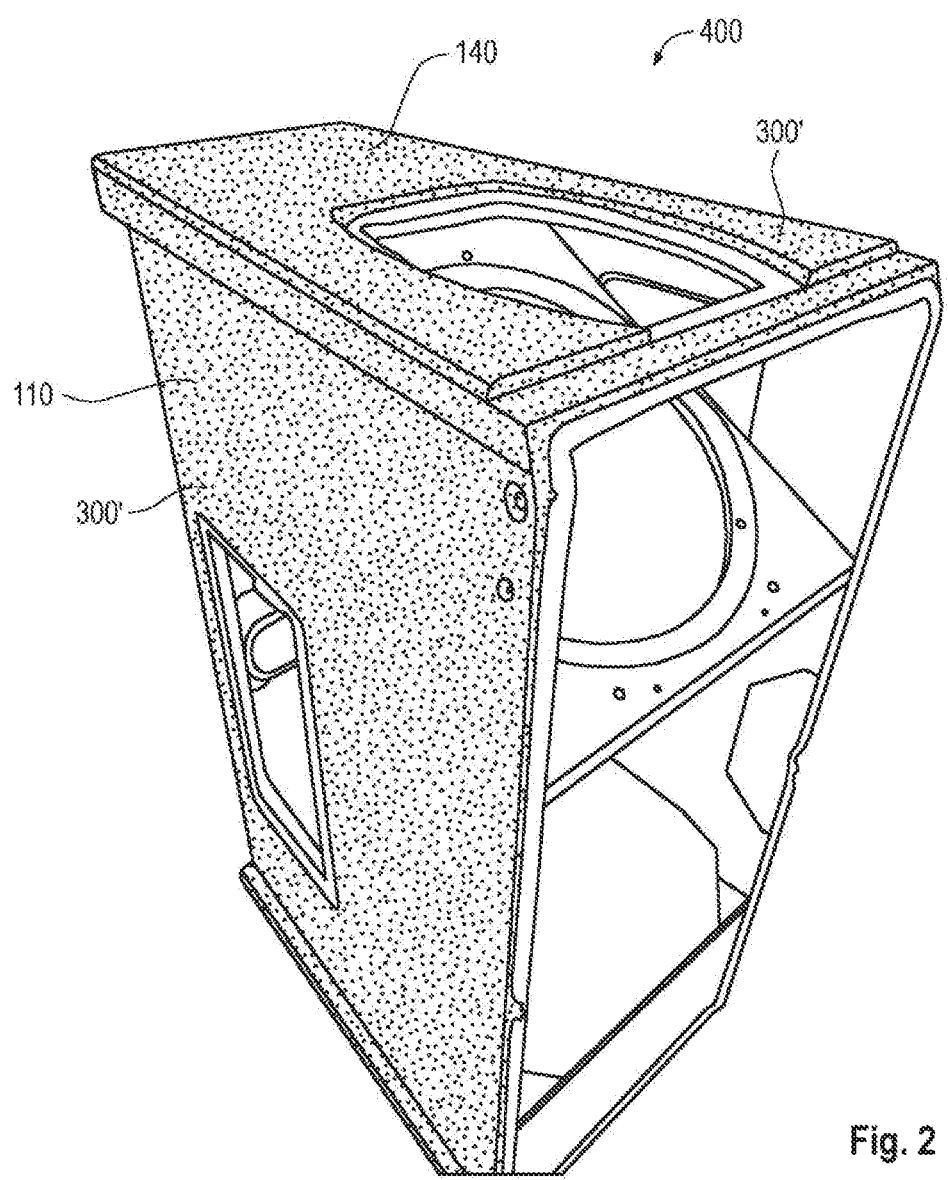
FIG. 2 is a perspective front view of an example of a plastic-coated loudspeaker housing.

It is evident from FIG. 2 that the entire outer surface of the plastic-coated loudspeaker housing 400 may be covered over by the plastic coating 300', while only any assembly and loudspeaker opening regions may be left uncoated. In FIG. 2, the wall element 110 forming the upper side of the loudspeaker housing and a wall element 140 forming a side wall of the loudspeaker housing 400 can be seen for example, wherein the loudspeaker housing 400 in this example being made with openings in the side walls 140 for additional grips for transporting and constructing the loudspeaker. Such housing openings may either be covered and sealed before the coating operation or be closed by corresponding slides or inserts in the mold.

Many loudspeakers, for example HF (high-frequency) loudspeakers, MF (medium-frequency) loudspeakers and LF (low-frequency: bass) loudspeakers, may be accommodated in the loudspeaker housing 400. The plastic-coated loudspeaker housing 400 may be for example the housing of a full-range loudspeaker system, a subwoofer or else a stage monitor. For example, the plastic-coated loudspeaker housing 400 may be the loudspeaker housing of a line-array loudspeaker enclosure, as is the case in the present example.

Figure 3:
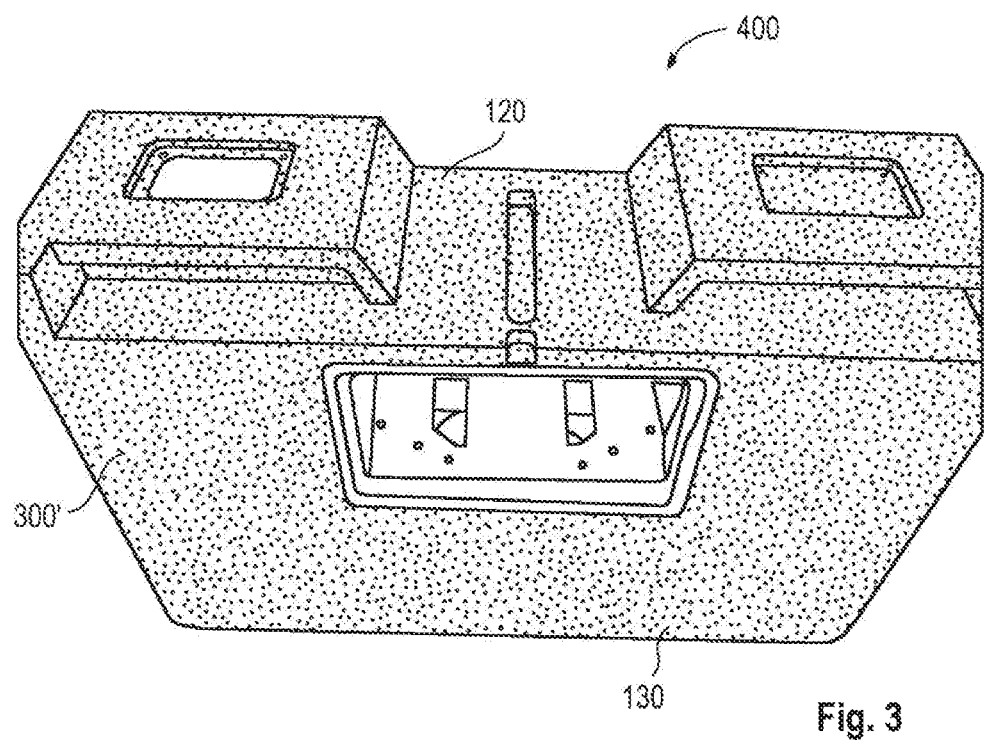
FIG. 3 is a perspective rear view of an example of a plastic-coated loudspeaker housing.

FIG. 3 shows in a perspective representation the rear view of the plastic-coated loudspeaker housing 400. As is evident in FIG. 3, the wall elements of the loudspeaker housing 400 may have a surface topology, i.e. have for example openings, depressions, slits, grooves, elevations, bevel profiles, and the like. These may for example serve as fastening elements or form mounting locations for supply leads and the like. In FIG. 3, such surface structures can be seen on the rear-side wall element 120 and on the wall element 130 of the underside of the loudspeaker housing 400. To this extent, the corresponding surfaces 210, 220, 230 of the mold 200 have a corresponding shaping that is widened by the width of the gap.

Figure 4:
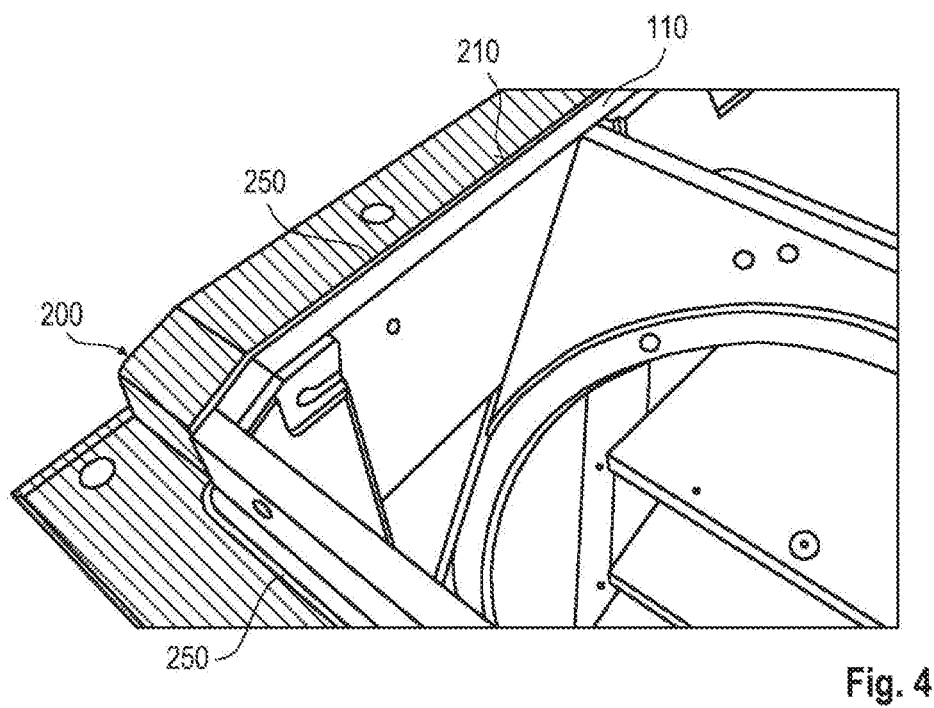
FIG. 4 is a perspective partial view of an example of a plastic-coated loudspeaker housing in a mold.

FIG. 4 shows a detail of the put-together loudspeaker housing 100 in the production stage of FIG. 1B, i.e. placed in the mold 200. The thin gap 250 between the outer surface of the wall element 110 and the corresponding surfaces 210 of the mold 200 can be seen.

The surface coating method according to the invention allows a greater dimensional stability of the plastic-coated loudspeaker housing 400 to be achieved than is the case with a conventionally painted loudspeaker housing. This is because a tolerance compensation with respect to the loudspeaker housing 100 is brought about by the coating in the mold 200 (which is always given the same dimensions). For example, although multiplex wooden panels are dimensionally very stable in their length, their width can vary in the case of a panel thickness of for example 15 mm for example by approximately ±0.5 mm. This means that the width of a multiplex wooden panel may for example be between 14.5 mm and 15.5 mm, and so the width of the loudspeaker housing 100 may vary from housing to housing by at least the same amount. Such structural tolerances are completely compensated by the surface coating.

Figure 5A:
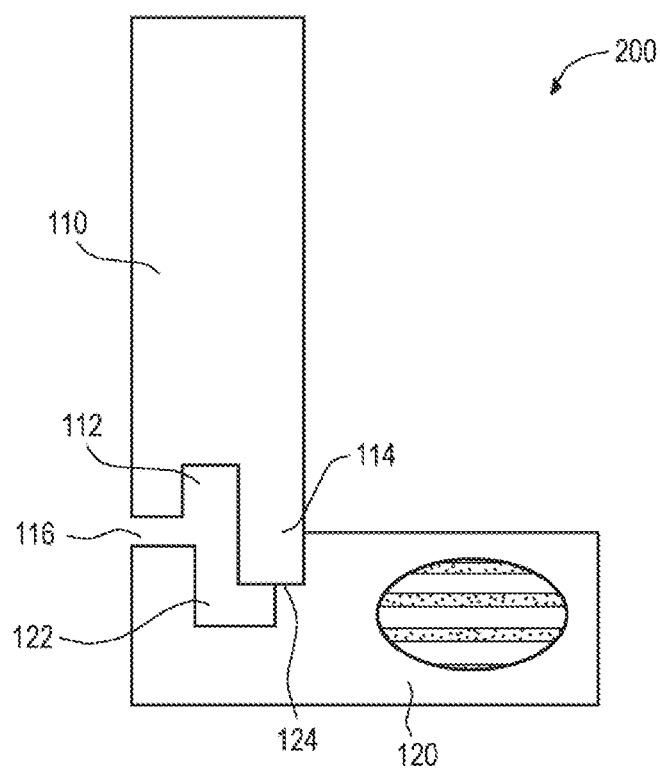
FIG. 5A is a sectional representation of two housing wall elements butting against one another before the surface coating.
Figure 5B:
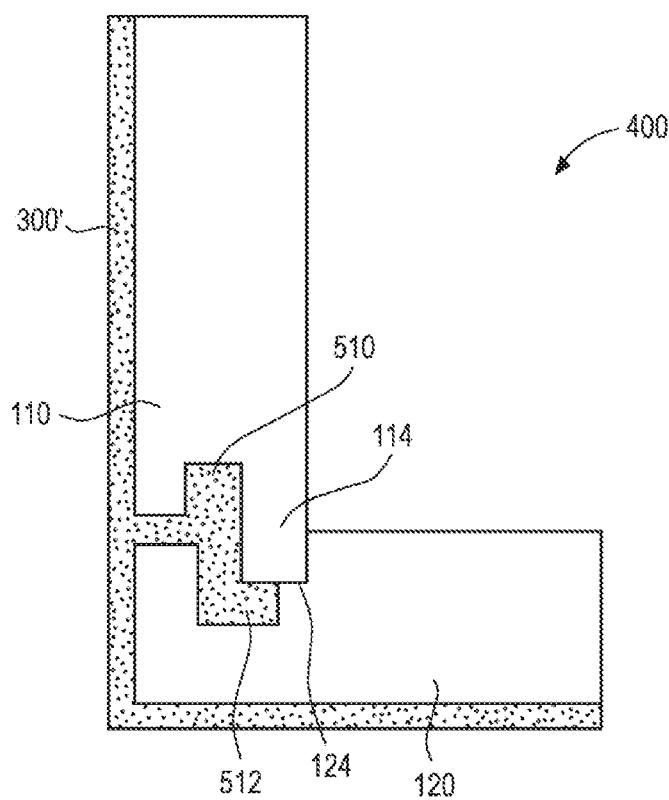
FIG. 5B is a sectional representation of the two housing wall elements butting against one another from FIG. 5A after the surface coating.

FIGS. 5A and 5B show a corner region of the loudspeaker housing 100 or of the coated loudspeaker housing 400 that is formed by two housing wall elements (for example the wall elements 110, 120). For example, a first groove 112 and a tongue 114 are formed on an end face of the first housing wall element 110. A second groove 122 is formed on a flat side of the second housing wall element 120. The second groove 122 may for example be made in a stepped manner. As illustrated in the encircled region, the housing wall elements 110, 120 may for example be produced from multiplex panels, for example consisting of birchwood.

In the put-together state, the tongue 114 enters the second groove 122. For example, the tongue 114 may stand on a step 124 in the second groove 122, and so a clearance remains under the tongue 114 in the second groove 122.

The tongue 114, the first groove 112 and the second groove 122 may delimit a fastening cavity, which is in connection with the outside of the loudspeaker housing 100 by way of a gap 116. The gap 116 may for example extend between the first housing wall element 110 and the second housing wall element 120.

In the surface coating, the fastening cavity is filled with plastic 300 by way of the gap 116. After the curing of the plastic in the fastening cavity, the cured plastic forms a fastening element 510, which is in engagement with the first housing wall element 110 and the second housing wall element 120 and also in connection with the surface coating 300'.

For example, the fastening element 510 may have an anchoring projection 512, which anchors the fastening element 510 in the second housing wall element 120.

Many different fastening elements 510 that are in connection with the surface coating 300' can be realized between butt joints of housing wall elements 110, 120, 130. For example, fastening elements 510 without a transversely running anchoring projection 512 (that would be the case for example if there were no step 124), with a single transversely running anchoring projection 512 or with a number of transversely running anchoring projections 512 may be formed on one or both housing wall elements 110, 120, 130.

Furthermore, butt joints between the housing wall elements 110, 120, 130 may be miter-cut, i.e. the fastening elements 510 described above and shown by way of example in FIGS. 5A and 5B do not have to be realized on a flat side and/or end face of housing wall elements 110, 120, 130, but may be formed between miter faces.

Figure 6:
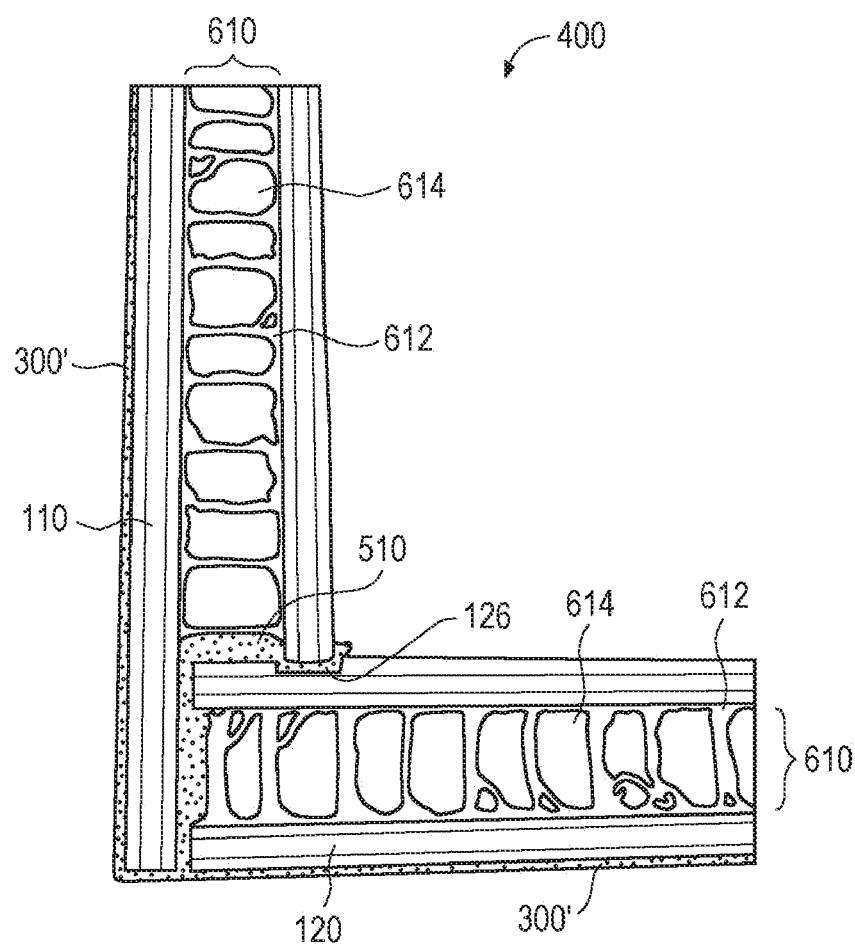
FIG. 6 is a sectional representation of two housing wall elements butting against one another in a sandwich type of construction with a plastic honeycomb core after the surface coating.

FIG. 6 shows a further sectional representation of two housing wall elements 110, 120 butting against one another. The housing wall elements 110, 120 are constructed here in a sandwich type of construction, with a plastic honeycomb core 610 placed between thin wooden panels. The plastic honeycomb core 610 may for example be constructed from a thermoplastic material 612 with voids 614. Such thermoplastic honeycomb panels with surfaces of wood or other materials are obtainable for example from the company enconcore N.V., Leuven, Belgium, or Plascore GmbH+Co KG, Waldlaubersheim, Germany.

As is evident from FIG. 6, the housing wall elements 110, 120 can be effectively connected to one another during coating by simply putting them together while maintaining a gap 116. Here, too, the surface coating 300' has the effect of producing a fastening element 510, which anchors the housing wall elements 110, 120 to one another. An optional surface groove 126 in the second housing wall element 120, in which the inner wooden panel of the first housing wall element 110 is inserted, can further increase the fastening stability.

A very stable connection between the housing wall elements 110, 120, which cannot be achieved so easily with screw or adhesive connections—in particular in the case of panels in a sandwich type of construction—is realized in this way.

All of the features described in the above exemplary embodiments (in particular fastening variants, materials, etc.) can be combined with one another. Generally, the fastening element 510 produced by the surface coating 300' can make it possible to dispense partly or completely with fastening means, such as for example screw connections, adhesive connections and/or tongue-and-groove connections, and nevertheless achieve the structural stability and/or airtightness and/or freedom from rattling and also dimensional stability required for a loudspeaker housing. This is so since it has been found that, by means of the surface coating 300', these properties of a loudspeaker housing 400 can be influenced and improved during the coating, or possibly even only subsequently brought about.

The invention claimed is:

1. A method for producing a plastic-coated loudspeaker housing, the method comprising:
    putting together a loudspeaker housing from a plurality of housing wall elements;
    placing the put-together loudspeaker housing in a mold; and
    surface coating the put-together loudspeaker housing by introducing a liquid, curable plastic into the mold, wherein:
        a fastening cavity is present in a region of abutment of a corner connection of a first housing wall element of the plurality of housing wall elements and a second housing wall element of the plurality of housing wall elements that have been put together, and
        the fastening cavity is filled with the liquid, curable plastic during the surface coating.

2. The method as claimed in claim 1, wherein the putting together of the loudspeaker housing represents a simplified assembly of the loudspeaker housing in which one or more of the group consisting of robustness, airtightness and freedom from rattling required for later operation is not achieved.

3. The method as claimed in claim 1, wherein, when putting together the loudspeaker housing from the plurality of housing wall elements, adhesive connections between housing wall elements of the plurality of housing wall elements are omitted.

4. The method as claimed in claim 1, wherein, when putting together the loudspeaker housing from the plurality of housing wall elements, screw connections between housing wall elements of the plurality of housing wall elements are omitted.

5. A plastic-coated loudspeaker housing, comprising:
    a loudspeaker housing comprising a plurality of housing wall elements; and
    a layer of plastic which covers the loudspeaker housing on an outside and which coats corner regions of housing wall elements of the plurality of housing wall elements butting against one another, wherein:
        a fastening cavity is present in a region of abutment of a corner connection of a first housing wall element of the plurality of housing wall elements and a second housing wall element of the plurality of housing wall elements, and
        the fastening cavity is filled with plastic of the layer of plastic.

6. The plastic-coated loudspeaker housing as claimed in claim 5, wherein:
    the fastening cavity comprises a first recess in the first housing wall element and a second recess in the second housing wall element, and
    the first recess and the second recess are in connection with one another and are filled with the plastic.

7. The plastic-coated loudspeaker housing as claimed in claim 6, wherein at least one of the first recess or the second recess is a groove.

8. The plastic-coated loudspeaker housing as claimed in claim 6, wherein the fastening cavity filled with the plastic is in connection with the layer of plastic by way of a gap between the first housing wall element and the second housing wall element.

9. The plastic-coated loudspeaker housing as claimed in claim 6, wherein:
    the first housing wall element has a first groove and a tongue on a first connecting surface;
    the second housing wall element has a second groove on a second connecting surface, and
    the tongue enters the second groove and the fastening cavity is delimited at least by the first groove, the second groove and the tongue.

10. The plastic-coated loudspeaker housing as claimed in claim 9, wherein:
    the first connecting surface is an end face or a first miter face, and
    the second connecting surface is a flat side or a second miter face.

* * * * *